United States Patent [19]
Peoples

[11] 4,307,267
[45] Dec. 22, 1981

[54] TESTING LOADED TRANSMISSION LINES

[75] Inventor: John T. Peoples, Berkeley Heights, N.J.

[73] Assignee: Bell Telephone Laboratories, Incorporated, Murray Hill, N.J.

[21] Appl. No.: 159,946

[22] Filed: Jun. 16, 1980

[51] Int. Cl.$^3$ ............................................. H04B 3/46
[52] U.S. Cl. ......................... 179/175.3 R; 324/57 SS
[58] Field of Search ................. 179/175.3 R, 175.3 F, 179/175; 324/51, 52, 54, 60 R, 60 B, 57 SS, 59

[56] References Cited

U.S. PATENT DOCUMENTS

| | | | |
|---|---|---|---|
| 3,751,606 | 8/1973 | Kaiser, Jr. | 179/175.3 R |
| 3,904,839 | 9/1975 | Peoples | 179/175.3 F |
| 4,087,656 | 5/1978 | Blum et al. | 179/175.3 R |
| 4,087,657 | 5/1978 | Peoples | 179/175.3 R |
| 4,087,658 | 5/1978 | Hoppough | 179/175.3 R |
| 4,229,626 | 10/1980 | Peoples | 179/175.3 F |

OTHER PUBLICATIONS

"Introduction to Modern Network Synthesis", Van Valkenburg, John Wiley & Sons 1960, pp. 128–131.

*Primary Examiner*—Thomas A. Robinson
*Attorney, Agent, or Firm*—Joseph P. Kearns

[57] ABSTRACT

Apparatus and method (FIG. 1) for testing inductively loaded telephone transmission lines for immittance irregularities approximate a ladder network of series inductors and shunt capacitors equivalent to the input impedance of the transmission line from the pole and zero frequencies of the differential phase versus frequency characteristic thereof. The differential phase function is obtained (FIGS. 5 and 6 combined or FIGS. 5 and 7 combined) as the Hilbert transform of the logarithmic difference between a direct and delayed impedance measurement extending over a swept-frequency range in the voice-frequency band. Inductance values of the ladder network are proportional to the inductances of the line loads and the capacitor values are proportional to the distances between load inductors spaced along a transmission line.

5 Claims, 8 Drawing Figures

TESTING LOADED TRANSMISSION LINES

FIELD OF THE INVENTION

This invention relates to the testing of inductively loaded transmission lines from one terminal thereof; and, in particular, to the location of faults in telephone subscriber loops.

BACKGROUND OF THE INVENTION

In my U.S. Pat. No. 4,087,657 granted May 2, 1978, there were disclosed apparatus and method for synthesizing a ladder network of series inductors and shunt capacitors from the differential phase of the input impedance of a telephone transmission line. The frequencies of the poles and zeros of the ladder network corresponded to the maxima and minima of the differential phase characteristic. The values of the respective inductors and capacitors in the synthesized network are respectively proportional to the load inductances and the spacing therebetween in the actual transmission line. A microprocessor with an appropriate read-out device generates the load inductances and the spacings automatically in response to the impedance measurement. As a result relatively unskilled test personnel can quickly obtain data on loaded transmission lines.

In my copending patent application bearing the Ser. No. 62,773 and filed Aug. 1, 1979 now U.S. Pat. No. 4,229,626 granted Oct. 21, 1980 there is disclosed a structure for generating the derivative with respect to frequency of the phase angle of the complex input impedance of an unloaded cable pair over an extended frequency range from magnitude measurements only.

It is an object of this invention to combine the teachings of my two prior disclosures to reduce further the complexity of implementation as well as the skill and time required to identify the parameters of an inductively loaded telephone transmission loop.

It is a further object of this invention to simplify apparatus and method for testing inductively loaded telephone transmission loops in order to identify incorrect loading on such loops.

SUMMARY OF THE INVENTION

In accordance with this invention the differential phase of the input immittance (a term generic to admittance and impedance) of a loaded telephone transmission line being tested is derived in the frequency domain from the instantaneous magnitude of such immittance measured with a periodically swept frequency extending over the voice-frequency range. This differential phase characteristic is processed to locate the approximate frequencies of the poles and zeros of the immittance as though the immittance were lossless, i.e., free of resistance or conductance components. A lossless ladder network comprising series inductors and shunt capacitors is next synthesized from the frequencies observed at poles and zeros of the differential phase characteristic. The values of the series inductors and the shunt capacitors of the synthesized ladder network are then found to be substantially proportional to the inductance values of the load inductors and the spacings between such loads, respectively. The resulting inductor and capacitor values are displayed on a readout device to be utilized by relatively unskilled personnel to obtain necessary data on a loaded line.

The data produced in the practice of the invention relate to the line under test in an approximate manner because the frequencies produced are the projections of the true poles (frequencies at which infinite immittances occur) and the true zeros (frequencies at which zero immittances occur) onto the complex frequency plane. Fortunately, the data are always sufficiently close to the true pole and zero frequencies to identify correctly loaded lines and, moreover, are sufficiently close to identify most problems in incorrectly loaded lines. Although there are instances in which incorrectly loaded lines exhibit normal pole-zero relationships, they are so few in number as not to impair the validity of the general principle employed in this invention.

The present invention acquires pole and zero frequency information from input immittance magnitude measurements and is thus free of the difficulties often encountered in making direct phase measurements. Accordingly, longer line lengths can be analyzed with workable precision than with prior arrangements.

BRIEF DESCRIPTION OF THE DRAWING

This invention with its features, objects and advantages will be readily appreciated from the following detailed description and the drawing in which.

DETAILED DESCRIPTION

Figure 1:
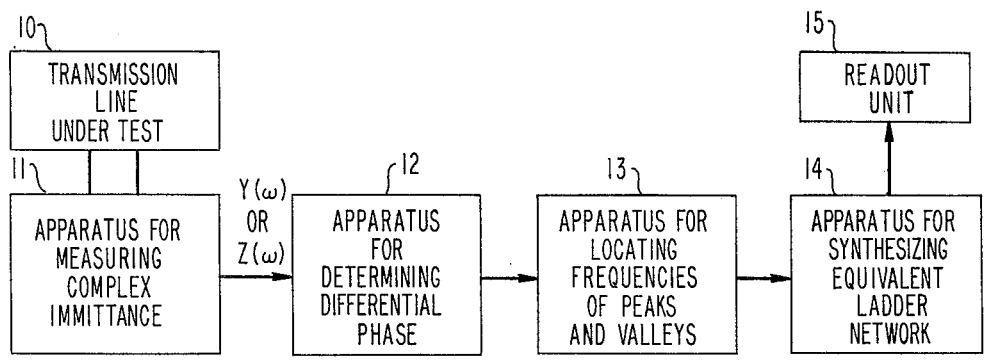
FIG. 1 is a block diagram of an arrangement for measuring the complex immittance of a transmission loop and synthesizing therefrom an equivalent ladder network.

The embodiment of FIG. 1 is an alternative representation of that shown in FIG. 1 of my aforementioned U.S. Pat. No. 4,087,657 with the transmission loop under test 10 indicated explicitly and frequency determining apparatus 101 of the prior patent separated into discrete functional blocks 11, 12 and 13. Block 11 represents apparatus for measuring complex immittance $Y(\omega)$ or $Z(\omega)$. Block 12 represents apparatus for determining differential phase from the immittance parameter. Block 13 represents apparatus for locating the frequencies of peaks and valleys in the differential phase characteristic. Block 14 is the equivalent of microprocessor 102 in my prior patent. Finally, readout unit 15 is an adjunct to apparatus for synthesizing an equivalent ladder network 14 for the purpose of displaying inductance and capacitance values of the synthesized ladder network.

Figure 5:
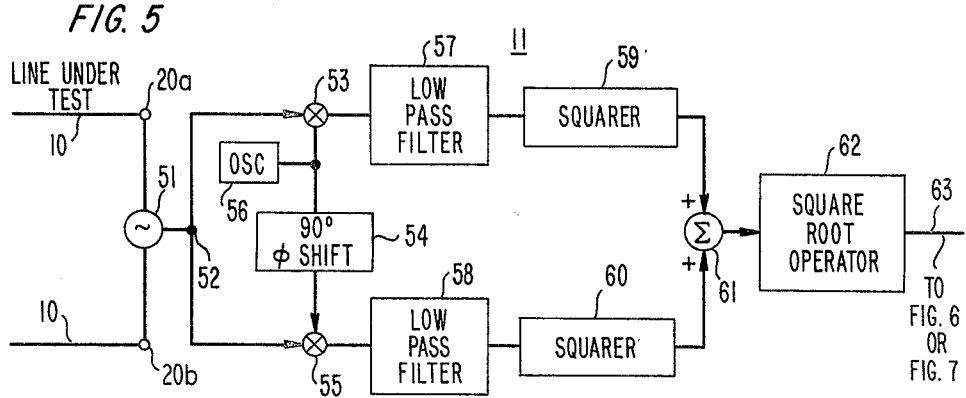
FIG. 5 is a block diagram of an apparatus for measuring the input immittance of a transmission loop under test.

In my previously cited copending patent application I have shown a swept frequency sinusoidal test wave being applied to input terminals of a transmission loop under test. FIG. 5 replicates the applicable portion of my prior disclosure, as it relates to the implementation of block 11 in FIG. 1. The swept test signal from generator 51 is applied to input terminals 20a and 20b of line 10 under test. The instantaneous voltage or current (depending upon whether impedance or admittance is being measured) is applied to line 10 under test and the corresponding current or voltage developed across source 51 is split into quadrature phases at junction 52 by means of oscillator 56. The direct and quadrature outputs obtained in modulators 53 and 55 with the aid of the direct output of oscillator 56 and the 90-degree phase-shifted output through phase shifter 54 are passed through respective low-pass filters 57 and 58 to remove double-frequency products of modulation. Each of the filtered waves is then squared in respective squarers 59 and 60. The latter apparatus are readily implemented by commercially available multipliers, such as Model MC1595 offered by Motorola Semiconductors of Phoenix, Ariz. The squared outputs of squarers 59 and 60 are combined additively in summation circuit 61 to form a signal proportional to the square of the magnitude of the input immittance $Y(\omega)$ or $Z(\omega)$, which after a square root operation is block 62 is then made available in direct form on lead 63.

Figure 6:
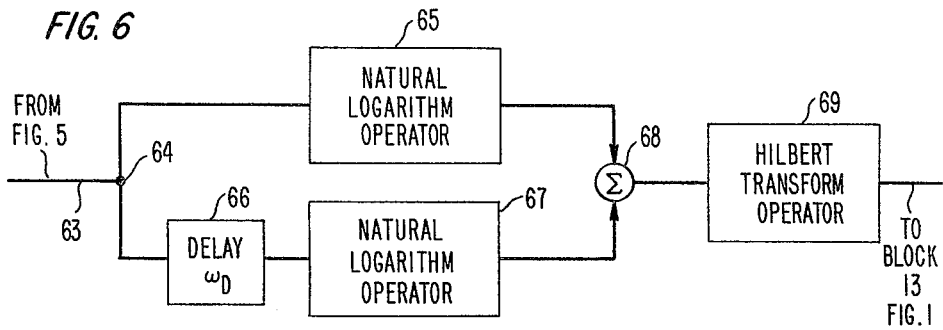
FIG. 6 is a block diagram of one embodiment of an apparatus for determining differential phase from an immittance measurement.

Block 12 in FIG. 1 is advantageously implemented by the apparatus shown in FIG. 6. This apparatus comprises natural logarithm operators 65 and 67, delay unit 66, combiner 68, and Hilbert transform operator 69. The immittance signal on lead 63 continued from FIG. 5 is split at junction 64 and applied directly to natural logarithm operator 65 and indirectly after a delay $\omega_D$ (an arbitrary amount chosen for purposes of analytical approximation) effected in delay unit 66 to natural logarithm operator 67. Operators 65 and 67 are commercially available from Burr-Brown Research Corporation of Tucson, Ariz. as Model 4127 Log Amplifier. Delay unit 66 can be a charge-coupled device arranged as an analog shift register, as is well known in the art. The delayed and undelayed logarithm signals are combined in subtraction circuit 68 to form an intermediate signal to be applied to Hilbert transform operator 69 where all frequency components are rotated by ninety electrical degrees to form the desired phase differential function. The latter function can be analyzed for frequencies at which peaks and valleys of energy occur.

Figure 7:
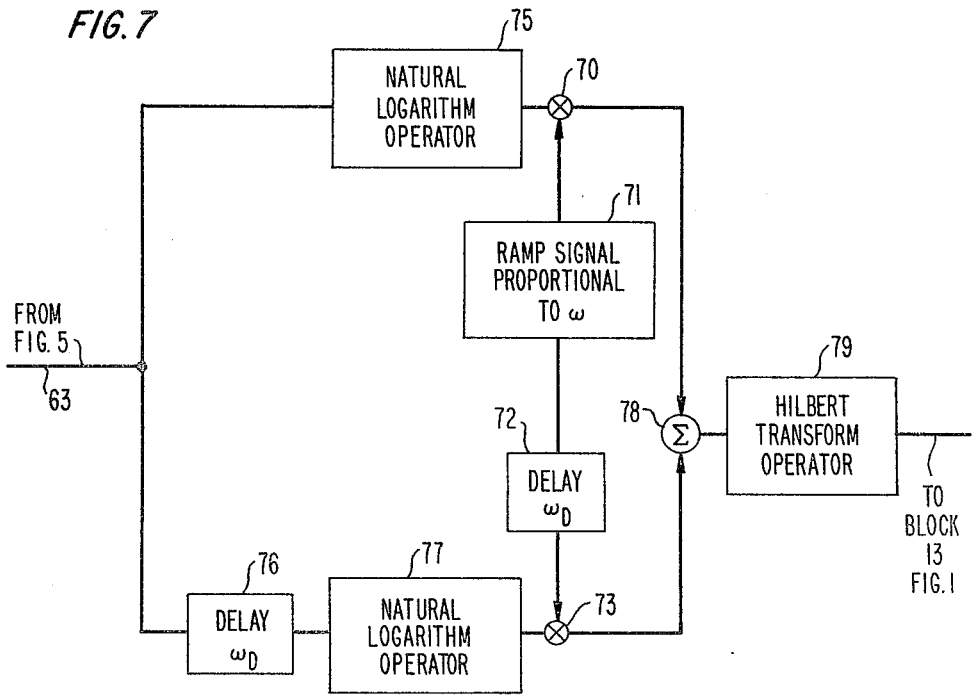
FIG. 7 is a block diagram of an alternative embodiment of an apparatus for determining differential phase from an immittance measurement.

An alternative structure is shown in FIG. 7 for the natural logarithm operation of FIG. 6. This structure exhibits improved convergence properties. The apparatus of FIG. 7 differs from that of FIG. 6 in the addition of a shunt path across the combining circuit comprising product multipliers 70 and 73, ramp signal generator 71 and delay unit 72. The circuit of FIG. 7 includes natural logarithm operators 75 and 77, delay unit 76, combiner 78 and Hilbert transform operator 79. The last-mentioned units are comparable respectively to natural logarithm operators 65 and 67, delay unit 66, combiner 68 and Hilbert transform operator 69 in FIG. 6.

Ramp signal unit 71 generates a ramp voltage or current proportional to the change of frequency in the swept frequency signal applied to the transmission loop under test in a conventional manner. Delay unit 72 is substantially the same as delay unit 66 in FIG. 6 and delay unit 76 in FIG. 7. The respective direct and delayed ramp signals from ramp signal source 71 multiply outputs of natural logarithm operators 75 and 77. The resultant compound ramp signals are combined in summation circuit 78 and applied to Hilbert transform operator 79 to provide a differential phase signal for application to block 13 in FIG. 1.

The governing equation for the arrangement of FIG. 5 is that derived as equation (11) in my copending application. Thus, in impedance form $$Z(\omega) = |Z(\omega)| e^{j\phi(\omega)} \qquad (1)$$

Alternatively, in admittance form the governing equation is $$Y(\omega) = |Y(\omega)| e^{-j\phi(\omega)} \qquad (2)$$

The governing equation for the arrangement of FIG. 6 is the same as equation (16) derived in my copending application. Thus, in terms of impedance $Z(\omega)$ the differential phase is $$\phi_D(\omega) = H[\ln|Z(\omega)| - \ln|Z(\omega - \omega_D)|] \qquad (3)$$

$$\phi_D(\omega) = H\left[\ln\left|\frac{Z(\omega)}{Z(\omega - \omega_D)}\right|\right] . \qquad (4)$$

In the terms of admittance $Y(\omega)$, the equivalent equations are $$\phi_D(\omega) = H[\ln|Y(\omega - \omega_D)| - \ln|Y(\omega)|] \qquad (5)$$

and $$\phi_D(\omega) = H\left[\ln\left|\frac{Y(\omega - \omega_D)}{Y(\omega)}\right|\right] . \qquad (6)$$

The governing equations for the arrangement of FIG. 7 can be developed from the previous equations by incorporating the ramp factors $(\omega)$ and $(\omega - \omega_D)$. Thus, in impedance form equation (3) translates into $$\phi_D(\omega) = H\left[\ln\left|\frac{\omega \ln Z(\omega)}{(\omega - \omega_D)\ln Z(\omega - \omega_D)}\right|\right] . \qquad (7)$$

Similarly, in terms of admittance, equation (5) translates into $$\phi_D(\omega) = H\left[\ln\left|\frac{(\omega - \omega_D)\ln Y(\omega - \omega_D)}{\omega \ln Y(\omega)}\right|\right] . \qquad (8)$$

The terms employed in the foregoing equations are defined as:
 $\omega$ = radian frequency of the test signal,
 $\omega_D$ = equivalent radian frequency delay amount,
 $\phi(\omega)$ = phase angle of the loop impedance,
 ln = natural logarithm operator,
 H = Hilbert transform operator,
 $Y(\omega)$ = loop admittance as a function of frequency, and
 $Z(\omega)$ = loop impedance as a function of frequency.

Figure 2:
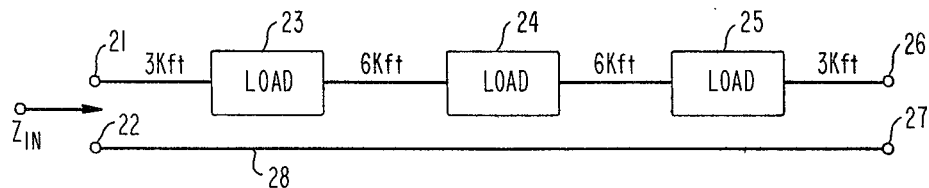
FIG. 2 is a diagram of a representative loaded telephone loop.
Figure 8:
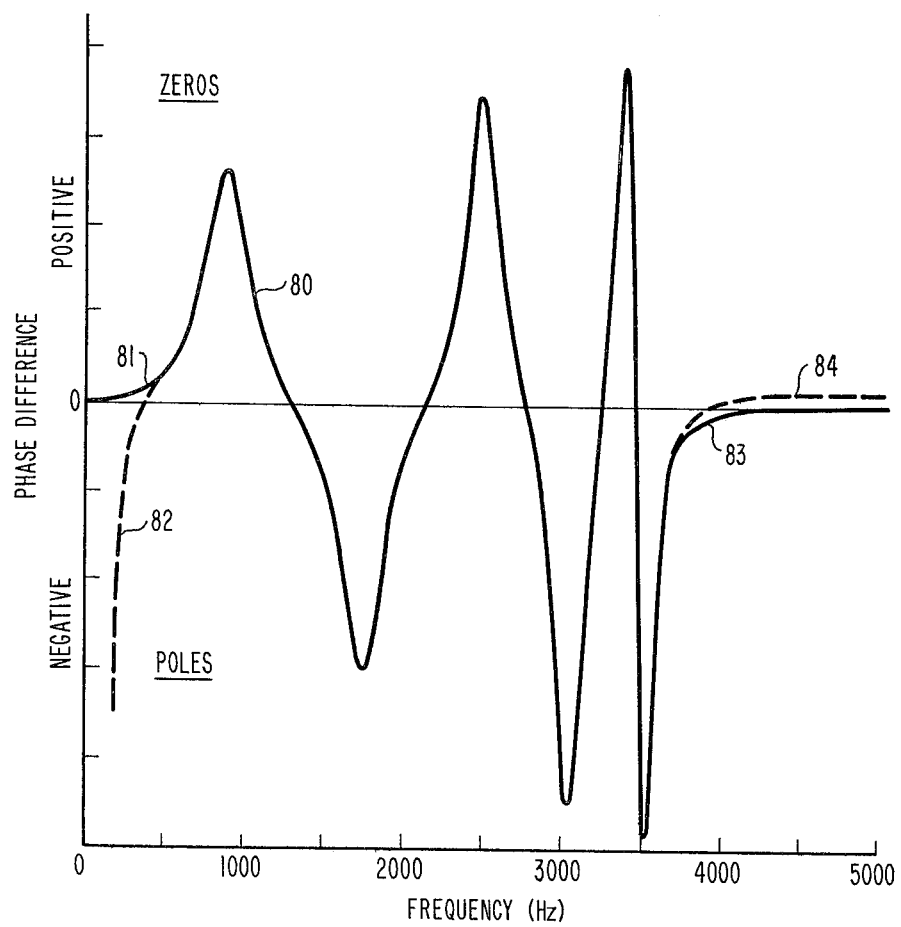
FIG. 8 is a differential phase versus frequency diagram from which a ladder network can be synthesized and which corresponds to the three-load practical example of FIG. 2.

FIG. 8 is a waveform showing the phase difference versus frequency characteristics defined by equations (3) and (5) for a three-coil loaded transmission loop shown generally in FIG. 2. The typical loaded subscriber loop comprises input terminals 21 and 22 connected at a telephone central office to a pair of 22-gauge copper wires leading to remote terminals 26 and 27 at a customer location. Ring conductor 28 is shown symbolically uninterrupted, except for possible splices, between terminals 22 and 27. The tip conductor running between terminals 21 and 26, on the other hand, has inserted at regular intervals on the order of 6000 ft (six kilofeet), except for the first and last intervals at three kilofeet, inductive load coils of nominal 88-millihenry (mH) value. In practice load coils are constructed as two-winding transformers with one winding in each conductor and poled in opposition to cancel longitudinal currents, but in phase to loop currents. The purpose of these load coils is to improve the voice-transmitting properties of twisted-pair cables and, in particular, to extend the range of transmission without using active repeaters. Inductive load coils are shown in FIG. 2 by blocks 23, 24 and 25 having a 6 Kft mutual separation. Loads 23 and 25 are spaced from respective terminals 21 and 26 by about 3 Kft. Additional intermediate coils on longer lines are spaced at further 6 Kft intervals, as necessary.

Returning to FIG. 8, the curve 80 terminating at the low-frequency end along the dash-line segment 82 and at the high frequency end along the dash-line segment 84 represents equation (3). Due to the nonzero terminations near-end and far-end irregularities cannot be detected with certainty. The curve 80 can be terminated in zero values by implementing equation (5) as shown in the circuit of FIG. 7. Improved convergence in calculating the spacing between irregularities and the magnitude of irregularities is obtained with equation (5) because the absolute immittance value is constant at high frequencies and has a large value at low frequencies.

The apparatus represented by block 13 in FIG. 1 is the same as, or equivalent to, the structure disclosed in U.S. Pat. No. 4,087,658 granted on May 2, 1978 to R. S. Hoppough and shown in FIG. 3 thereof. That structure comprises an operational amplifier with a bidirectional nonlinear feedback circuit using oppositely poled diodes and a capacitor between an inverting input and ground. The nonlinear feedback circuit remains nonconductive until voltages of either polarity exceed predetermined threshold values. A grounded capacitor is charged and discharged by current in the feedback path. The polarity and magnitude of the feedback current are determined by the slope of a signal, i.e. of the type shown in FIG. 8, applied to the noninverting input terminal of the operational amplifier. A feedback voltage, complementary to the feedback current, is amplified and clipped in a further operational amplifier. The output signal from the further operational amplifier shifts between two levels in response to slope reversals in the signal being examined. A high-pass filter distinguishes the transitions between these two levels and thereby indicates the peaks and valleys in the signal coming from block 12 by respective positive and negative output signals.

The apparatus represented by block 14 in FIG. 1 is the same as, or equivalent to that shown in block 14 of FIG. 2 in my cited U.S. Pat. No. 4,087,657.

In particular, the frequency range through which the generator 51 in FIG. 5 of this application is being swept is converted into continually changing binary numbers. At each recognition of the occurrence of a peak or a valley in the differential phase characteristic the number corresponding to the associated frequency is made available in the apparatus of block 14.

The remainder of block 14 comprises a microprocessor designated by Intel Corporation and other manufacturers as type 8080. This microprocessor operates on the 14-bit data words codifying the peak and valley frequencies associated with the output of block 12 to synthesize an LC (inductance-capacitance) ladder network of the form shown in FIG. 3. This network exhibits an indefinite number of series inductors $L_1$, $L_2$, ... $L_n$ whose junction points are shunted to ground by capacitors $C_0$, $C_1$, ... $C_n$ between input terminals 21-22 and output terminals 26-27. This structure is known as a first Cauer network after the mathematician William Cauer, who completed a mathematical analysis of its properties. See, in this connection, *Introduction to Modern Network Synthesis* by M. E. Van Valkenburg (John Wiley and Sons 1960, pages 128 to 131).

The input impedance of a first Cauer ladder network is defined by a ratio of the products of the differences between the squares of the complex frequency operator s and the respective zero and pole frequencies of the network. Thus, $$Z_{in}(s) = K \frac{(s^2 - z_1^2)(s^2 - s_2^2) \ldots (s^2 - z_n^2)}{(s^2 - p_1^2)(s^2 - p_2^2) \ldots (s^2 - p_n^2)} \quad (9)$$

where

K = a scale factor,
n = number of load coils,
s = complex frequency,
$z_1$ to $z_n$ = indexed frequency at positive peaks of the differential phase characteristic, and
$p_1$ to $p_n$ = indexed frequencies at the negative peaks of the differential phase characteristic.

By carrying out the multiplications indicated in equation (9) and inverting, the input admittance is obtained as a ratio of polynomials including constant coefficients $a_n$ and $b_n$:

$$Y_{in}(s) = K \frac{s^{2n+1} + a_{2n-1} s^{2n-1} + \ldots a_1 s^1}{s^{2n} + b_{2n-2} s^{2n-2} + \ldots b_0 s^0}. \quad (10)$$

FIG. 8 is the phase difference characteristic corresponding to the three-load coil transmission line of FIG. 2. From this characteristic sharp frequency maxima and minima are observed. Maxima correspond to zero frequencies and minima correspond to pole frequencies insertable in equation (9). The following zero and pole frequencies can be read from FIG. 8:

Zeros: 0.887 kHz, 2.476 kHz, and 3.382 kHz
Poles: 1.745 kHz, 3.038 kHz, and 3.522 kHz.

As a practical matter the microprocessor in block 14 recognizes these frequencies as binary numbers.

Figure 3:
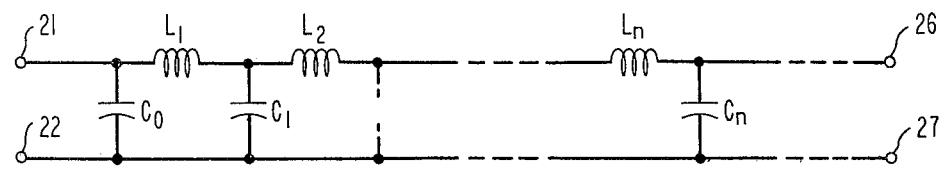
FIG. 3 is a simplified schematic diagram of a synthesized ladder network.

These frequencies when inserted into equation (9) are processed by the microprocessor to determine the values of capacitors $C_0$ through $C_3$ and inductors $L_1$ through $L_3$ in FIG. 3.

The detailed steps of an analogous calculation for a two-load example are shown in columns 6 and 7 of my prior U.S. Pat. No. 4,087,657. This example is herewith incorporated by reference into this specification.

By carrying out the long-division steps appropriate to equation (9) with the frequency values given above, the following capacitor and inductor values are obtained for the three-load loop of FIG. 2;

$C_0 = 1.00000$ f $= 2.896$ kft
$C_1 = 2.034649$ f $= 5,892$ kft
$C_2 = 2.123458$ f $= 6.150$ kft
$C_3 = 1.160900$ f $= 3.362$ kft
$L_1 = 0.158137$ H $= 88.000$ mh $L_2 = 0.155092$ H $= 86.306$ mh
$L_3 = 0.147351$ H $= 81.998$ mh The capacitance and inductance values calculated in either of equations (9) or (10) are normalized to a reference capacitance of 1.0 farad and to Hertzian frequencies in kilohertz. Accordingly, scaling factors related to practical magnitudes have been suppressed. It becomes necessary then to denormalize the calculated values by conversion from Hertzian to radian frequencies and to assume a reference value for inductance. A nominal value of 88 millihenries is chosen for the near end load inductor. Denormalization in the frequency domain requires dividing each inductor and capacitor by $2\pi$ (1000). The $2\pi$ factor accounts for the difference between frequency in Hertz and frequency in radians; the factor of 1000 converts kHz to Hz. Denormalization of each inductor and capacitor element so as to fix $L_1$ at the arbitrarily selected 88 mh requires dividing each frequency-compensated inductor by the factor $L_1/2\pi(88)$, where $L_1 = 0.158137$, as calculated from equation (9) or (10), and multiplying each frequency-compensated capacitor by this same factor. Finally, the calculated capacitance values may be converted to cable lengths by taking the known capacitance per unit length of cable of 0.01572 mf per kft.

For example, 22-gauge cable is known to have a capacitance of 0.015723 mf per thousand feet of cable. The conversion factor for a near-end capacitor of 1.0 farad is converted to cable length by the factor $$(1000L_1/88 \times 2\pi \times 2\pi \times 0.01572) = 18.3 L_1 \qquad (11)$$

The near-end cable length becomes 18.3 times 0.158137 or 2.896 kft. The intermediate lengths are proportional to the calculated capacitance values of 2.034649 and 2.123458 mf or 5.892 kft and 6.150 kft, respectively. Similarly, the far-end cable length is found to be 1.1609 times 2.896 kft or 3.362 kft. These values are within a reasonable tolerance of the nominal values.

Load inductor values are proportional to the ratio of the calculated values of $L_2$ and $L_3$ with $L_1$, or 86.306 mh and 81.998 mh.

Figure 4:
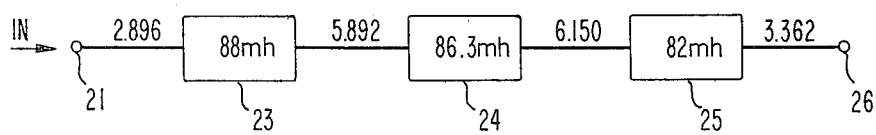
FIG. 4 is a diagram of a transmission loop synthesized from the ladder network of FIG. 3.

The complete denormalized three-load coil transmission loop is symbolically diagrammed in FIG. 4. Three coils 23 through 25 are shown between input terminal 21 and output terminal 26.

While this invention has been described in terms of specific embodiments, it will be apparent to those skilled in the pertinent art that many alternatives, modifications and variations fall within the scope of the appended claims.

I claim:

1. Apparatus (FIGS. 1, 2, 5) for approximating the values of loading coils and the spacings therebetween along a loaded communications cable (10) from the input terminals (20a, 20b) thereof, having connected to such input terminals a swept-frequency source (51), an arrangement for synthesizing a ladder network (FIG. 3) of inductors and capacitors whose values are proportional to the magnitudes of the inductances of such coils and their spacing distances characterized in that
    means (FIG. 5) responsive to said swept-frequency signal source (51) measures the magnitude of the input immittance of said communications cable (10), and
    means (FIG. 6) for Hilbert transforming the differences between natural logarithms of a direct and delayed immittance magnitude from said measuring means yields the equivalent of said derivative with respect to frequency of the phase angle of said immittance.

2. The apparatus defined in claim 1 further characterized in that
    means (59, 60, 61) for squaring and combining the amplitudes of quadrature-related phases of said swept-frequency signal yields the square of said input immittance magnitude,
    means responsive to said squaring and combining means takes the square root of the said squared immittance magnitude, and
    means (65, 66, 67) for taking the difference between natural logarithms of direct and delayed immittance magnitudes from said square-root taking means yields an intermediate signal suitable for Hilbert transformation.

3. The apparatus defined in claim 1 further characterized in that
    means (59, 60, 61) for squaring and combining the amplitudes of quadrature-related phases of said swept-frequency signal yields the square of said input immittance magnitude,
    means (62) responsive to said squaring and combining means takes the square root of said squared input immittance,
    means (75, 76, 77) responsive to said square-root taking means transforms the square root of said input immittance into further signals proportional to direct and delayed natural logarithms of said input immittance,
    means (71, 72) responsive to the sweep rate of said swept-frequency source provides direct and delayed ramp signals,
    means (70, 73) responsive to the direct and delayed ramp signals from said providing means modulates said respective further signals therewith to form direct and delayed ramp-weighted natural logarithms of said input immittance magnitude, and
    means (78) for taking the difference between said weighted further signals from said modulating means yields an additional intermediate signal suitable for Hilbert transformation.

4. A method for approximating a loaded communications cable including the step of determining the approximate pole and zero frequencies at which the differential phase with respect to frequency characteristic of the input immittance of said cable exhibits minima and maxima and synthesizing a ladder network comprised of series connected inductors and shunt connected capacitors related to said pole and zero frequencies such that inductance and capacitance values are proportional respectively to the inductances of said cable and their spacings in which said differential phase with respect to frequency characteristic is obtained in additional steps characterized in that
    in a first step the magnitude of the input immittance of the loaded cable under test is determined from an amplitude component of the signal measured at the input terminals thereof independently of any phase component resulting from the application of a swept-frequency signal to the input terminals,
    in a second step intermediate signals are obtained from the natural logarithms of direct and delayed replicas of the immittance measurement from said first step, and
    in a third step a further signal proportional to the derivative of the phase-angle component is obtained from a Hilbert transform operation on the intermediate signal from said second step.

5. The method according to claim 4 further characterized in that
in a further step said intermediate signals are modulated with direct and delayed ramp signals proportional to the swept rate of said swept-frequency measuring signal.

* * * * *